United States Patent [19]

Rochat

[11] Patent Number: 5,169,053
[45] Date of Patent: Dec. 8, 1992

[54] HEATING DEVICE FOR A ROBOT

[75] Inventor: Daniel Rochat, Saint-Blaise, Switzerland

[73] Assignee: Schunk Automation A.G., Switzerland

[21] Appl. No.: 613,780

[22] PCT Filed: Apr. 2, 1990

[86] PCT No.: PCT/CH90/00087
§ 371 Date: Nov. 30, 1990
§ 102(e) Date: Nov. 30, 1990

[87] PCT Pub. No.: WO90/11864
PCT Pub. Date: Oct. 18, 1990

[30] Foreign Application Priority Data

Apr. 3, 1989 [CH] Switzerland ............ 01206/89
Apr. 14, 1989 [FR] France ............ 89 05093

[51] Int. Cl.5 ............................................. B23K 7/10
[52] U.S. Cl. ............................................. 445/45; 266/48
[58] Field of Search ............ 228/45, 57; 266/48, 266/77

[56] References Cited

U.S. PATENT DOCUMENTS 4,475,719 10/1984 Lotz ............................... 266/48
4,809,956 3/1989 Donze ............................ 266/48

FOREIGN PATENT DOCUMENTS 0309665 4/1989 European Pat. Off. .
932710 9/1955 Fed. Rep. of Germany .

*Primary Examiner*—Kenneth J. Ramsey
*Attorney, Agent, or Firm*—Pollock, Vande Sande & Priddy

[57] ABSTRACT

The device comprises a body, a support, a welding torch, a connecting means ensuring the mobility of the support and of the welding torch. The welding torch can occupy at least one working position in which the flame effects one welding position and one rest operation in which the flame is sheltered. The device also has a screen which makes the flame during passage from the rest position to the working position. The invention can be used for welding robots.

4 Claims, 3 Drawing Sheets

HEATING DEVICE FOR A ROBOT

TECHNICAL FIELD

The instant invention relates to a heating device for a robot, such as a flame gas welding head designed for use with a robot.

BACKGROUND OF THE INVENTION

Welding robots are known which are designed to assemble parts, for example to weld electronic components onto a printed circuit. In the known devices, the welding operation is carried out using a mobile bit brought into contact with the part to be welded and a metal wire having a low fusion point maneuvered in such a manner that its extremity touches the parts to be welded when these are heated by the bit. Devices of this kind are easy, to manipulate since the temperature of the bit is low enough to ensure that the radiation which it generates does not affect the environment of the parts to be welded or the areas swept during passage from one working point to another. The quality of the weld obtained using a device of this type is unfortunately inferior to that achieved using a flame gas welding torch. This is due to the fact that the welding torch makes it possible to attain temperatures higher than those obtained using a bit and hence to obtain a more liquid weld, ensuring a better quality join.

Welding heads are also known which are designed to be mounted on a robot and equipped with a welding torch making it possible to use flame gas welding Nevertheless devices of this type have a disadvantage which complicates their use. The temperature of the burning gas is very high and can reach 2700° C. The robot program thus has to provide for displacement of the head so that the flame cannot destroy or ignite any of the parts located on the working table. The flame consequently has to be moved back a considerable distance from the working surface when it is moved from one work station to another. As a result, the time taken to complete one operation is significantly lengthened.

One possibility would be to lower the flame or even extinguish it before moving the head. However, some fifteen seconds unfortunately elapse before the flame is stabilized after being lit, or after any substantial change in its intensity This, too, also lengthens the working time.

SUMMARY OF THE INVENTION

It is the object of the present invention to make it possible to use a flame gas in heating operations without having to reduce the speed of operation.

The instant invention therefore provides a flame gas heating device for use with a robot comprising a body adapted to be fixed to the robot, a support mounted on the body and a welding torch integral with the support. In addition, it comprises connecting means to ensure the mobility of the support on the body and an enclosure, whereby the support and the welding torch can occupy a first position in which the flame associated with the welding torch is capable of carrying out a heating operation and a second, rest position in which the flame is confined within the enclosure.

As a result of these features, the heating device can be moved from one point to another without risk of damage.

BRIEF DESCRIPTION OF THE DRAWINGS

The invention will now be illustrated by the following description of one embodiment with reference to the drawings in which.

Figure 1:
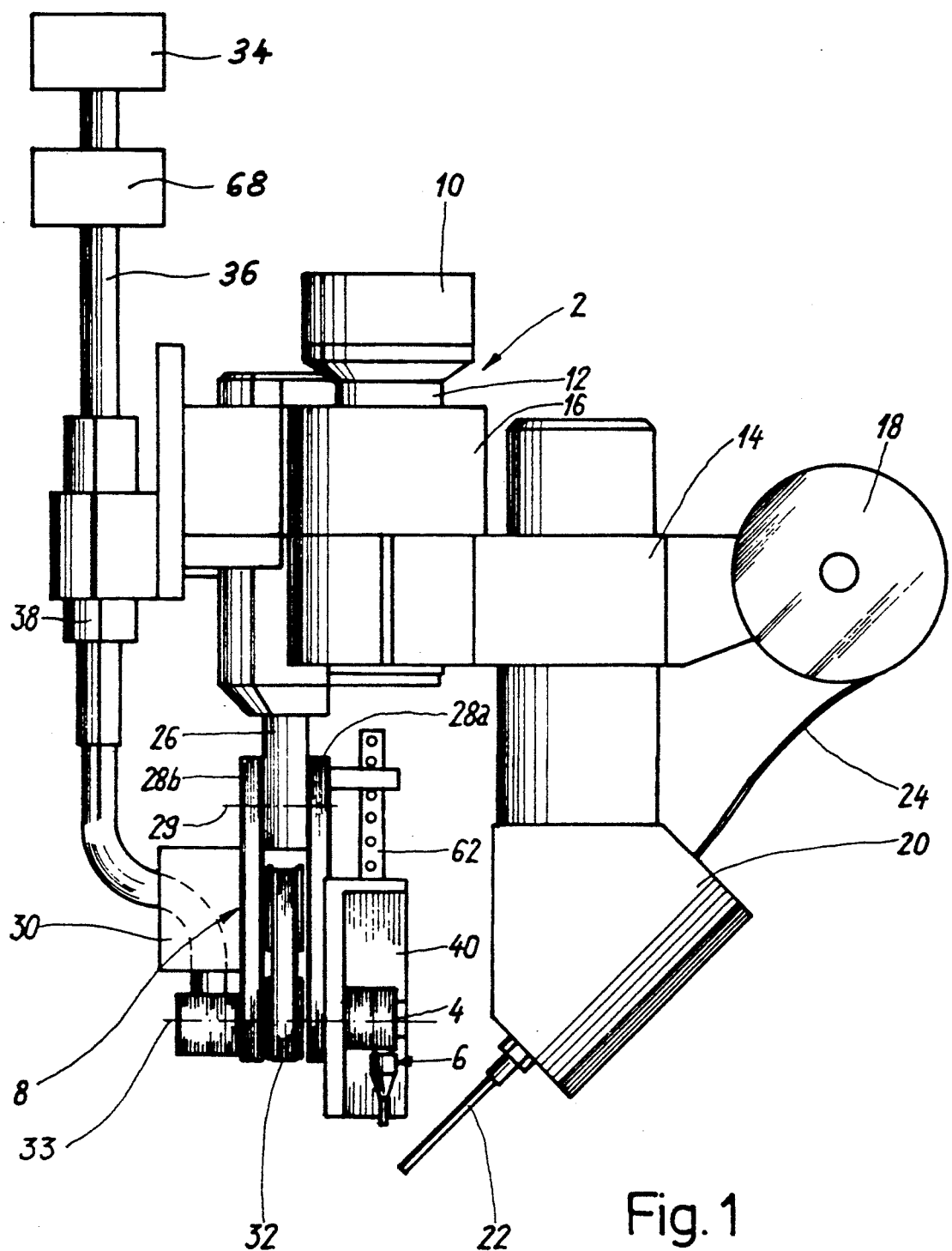
FIG. 1 is a general view of a welding head according to the invention.

The welding head shown in FIG. 1 comprises a body 2, a support 4, a welding torch 6 mounted on the support 4 and connecting means 8 ensuring the mobility of the welding torch 6 and of the support 4.

DETAILED DESCRIPTION OF THE INVENTION

More specifically, the body 2 is composed of a mounting flange 10 adapted to mount the head on a robot, a rod 12 integral with the flange 10 and two frames 14 and 16 mounted on the rod 12. The frame 14 has a coil 18 and an unwinder 20 terminating in a tube 22. The coil 18 carries a metal wire 24 having a low fusion point inserted in the unwinder 20 and emerging from the free extremity of the tube 22. The frame 16 carries the connecting means 8. These latter comprise a foot 26, two arms 28a and 28b mounted in parallel and rotatably mounted on this foot 26 about an axis 29, a pneumatic motor 30 and a belt transmission 32 driven by the motor 30. The support 4 and the welding torch 6 are carried by the extremity of the arms 28a and 28b rotatably mobile about a horizontal axis 33. The welding torch 6 is fed by a generator 34 via the intermediary of pipes 36 and through a flash-back protection device 38. The arm 28a also carries a screen 40, the function of which will be explained below.

Figure 2:
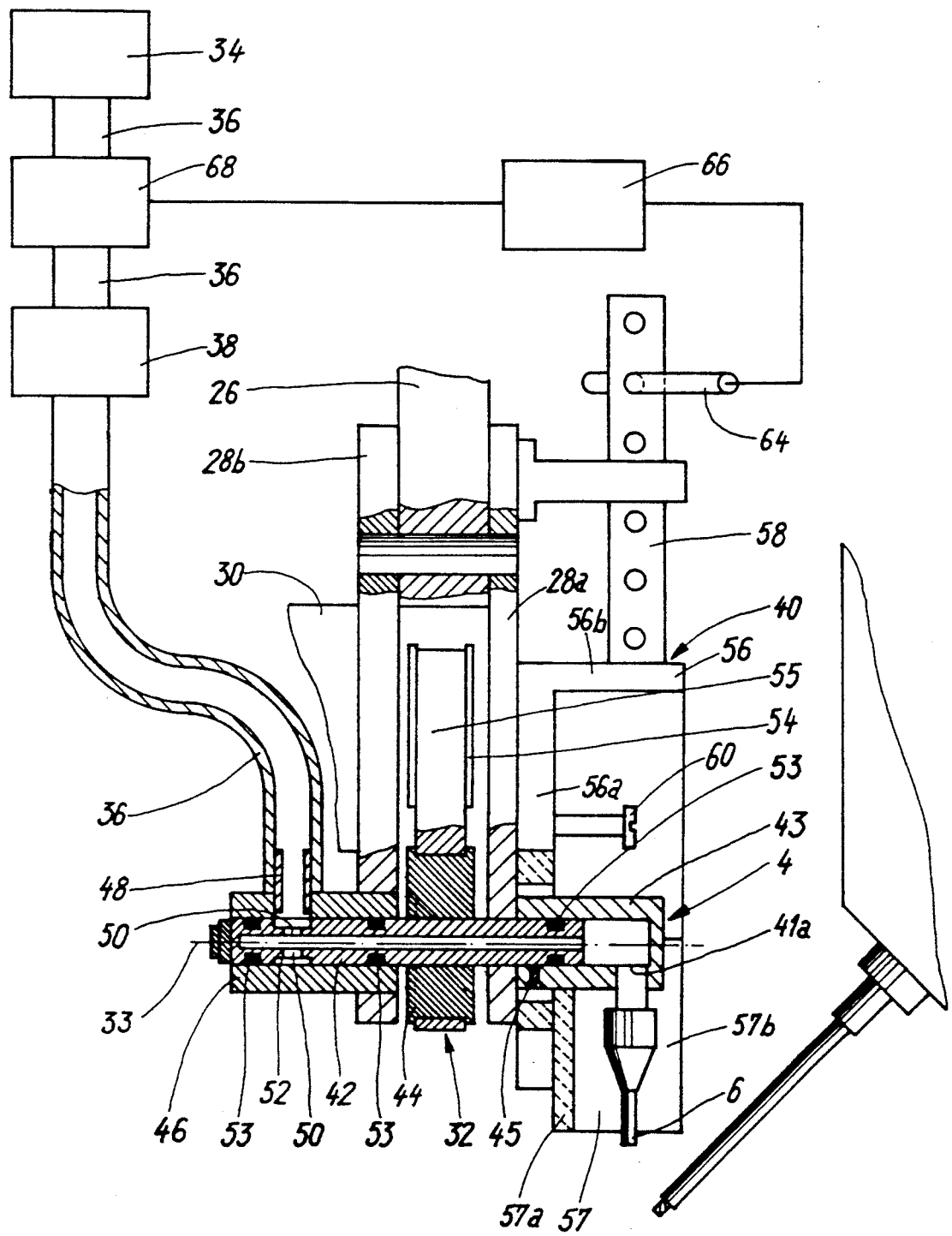
FIGS. 2 and 3 show the support and the welding torch for use with the head of FIG. 1 from two different angles.

FIG. 2 shows in greater detail the foot 26, the arms 28a, 28b and the parts that are integral therewith. More specifically, it will be noted that the support 4 comprises a tube 42 and a sleeve 43 inserted into one of the extremities of the tube 42 and carrying the welding torch 6. The tube 42 is pivotally mounted in the arms 28a and 28b. A pulley 44, interposed between these latter is integral with the tube 42. The sleeve 43 is fixed to the tube 42 by means of a clamping screw 45. A part 46, integral with the arm 28b, has a connector 48 onto which the tube 36 is fitted. The tube 42 has openings 50 in the wall of the tube in a zone provided with an annular recess 52. The inner extremity of the connector 48 is open to the recess 52.

The tube 42 has, in addition, grooves located on either side of the recess 52 as well as at the extremity located at the inside of the sleeve 43, inside which are fitted gaskets 53. The gas fed through the pipes 36 passes through the connection 48 and then through openings 50 inside the tube 42 and is brought to the welding torch 6. The gaskets 53 prevent gas escaping.

The welding torch 6 can be rotated about the axis 33 by means of a pneumatic motor 30 fixed to the arm 28b. For this purpose, the shaft of the motor 30 has a pulley 54 connected to the pulley 44 by means of a belt 55, the pulleys 44 and 54 and the belt 55 together constituting the transmission 32.

Figure 3:
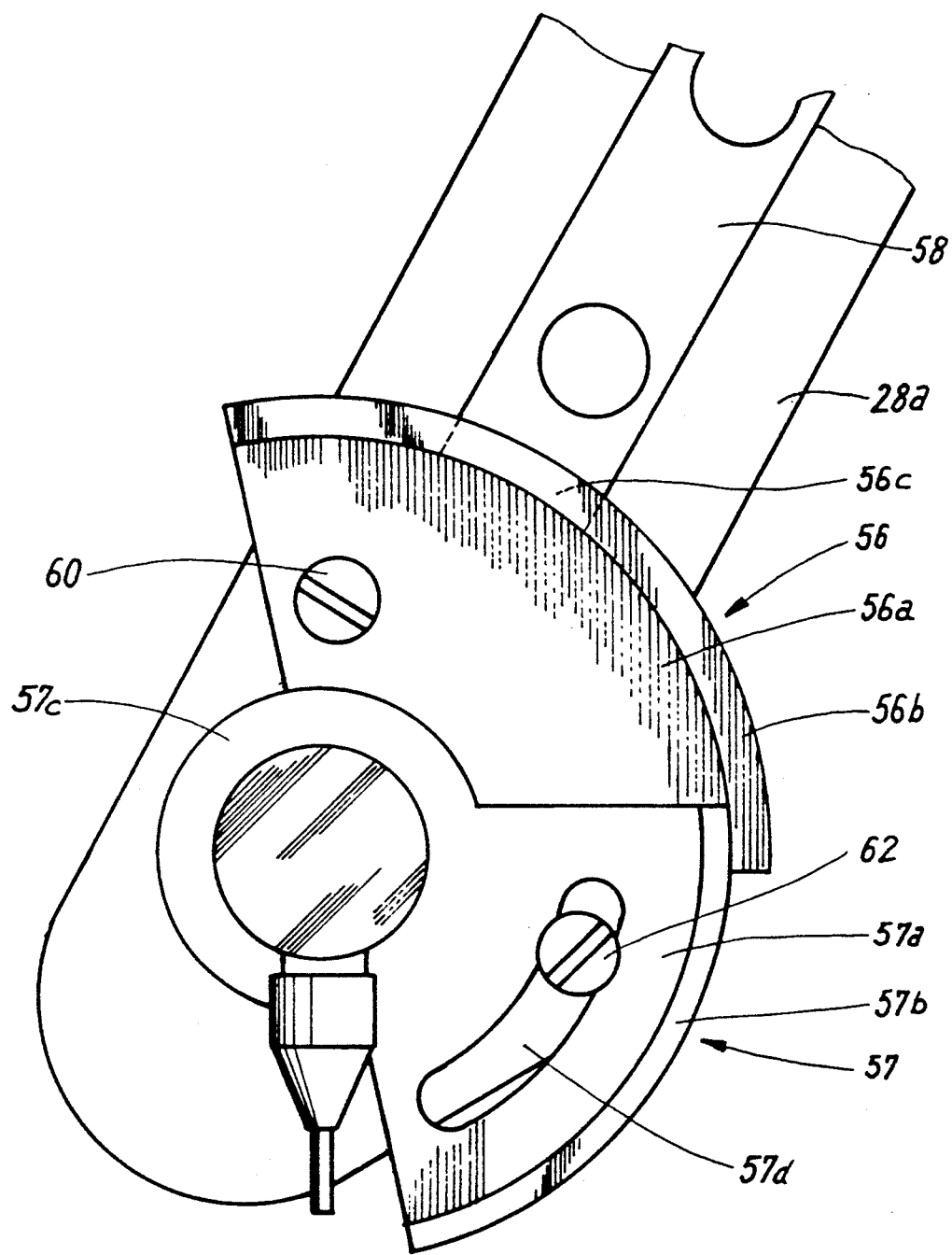

As has been explained hereinabove, the screen 40 is fixed to the arm 28a. It is advantageously of ceramic material, for example of the Macor TN 14 type manufactured by Fiber Optic, Spreitenbach (Switzerland). More specifically, this screen comprises three separate pieces designated reference numerals 56, 57 and 58 (FIGS. 2 and 3). The part 56 has the shape of a sector of a circle defining a planar wall 56a, the circular periphery of which is integral with a wall 56b of annular section. The opening of the sectors is about 90°. The planar wall 56a is fixed to the arm 28a by means of a screw 60, the elongated head of which forms a stop for the welding torch. The wall 56b is pierced by a hole 56c, the function of which will be explained below.

The part 57 has the shape of a sector of a circle defining a planar wall 57a, the circular periphery of which is integral with a wall 57b of annular section, whereas the part next to the centre is formed of an annular part 57c surrounding the sleeve 43. The wall 57a has a recess 57d that is annular in section and on the inside of which a screw 62 is engaged that is screwed into an inside thread of the arm 28a.

The part 58 is composed of a tube, the walls of which are perforated. It is engaged in the hole 56c and is oriented towards the axis of the tube 42.

A heat probe 64 is engaged in two holes of the extremity of the part 58 furthest from the axis of the tube 42. This is connected to a safety circuit shown diagrammatically at 66, controlling a safety valve 68 capable of interrupting the gas supply to the welding torch 6.

The welding torch is advantageously supplied by means of a gas generator of the Sirflame type manufactured by Spirig, Rapperswil (Switzerland).

In order to use a robot provided by a welding head of this type, the head is first mounted on the robot. The gas supply pipe is connected to the Spirflame-type generator and the electric control leads from the wire unwinder connected to the control device associated with the robot control system. The angular position of the welding torch is then adjusted in such a way that the flame is projected in the desired direction and the intensity of the gas flow is regulated to give a flame of suitable length. The rest position of the welding torch is defined by the head of the screw 60 which positions the welding torch in such a way that the flame is projected towards the inside of the part 58. The welding torch is placed in the working position to light the flame and is then moved to the rest position. The robot is then started up. Initially, the flame is thus confined inside the part 58 and heats the probe 64. As a result, the safety circuit 66 guarantees maintenance of the gas supply to the welding torch. When the robot reaches the point at which welding is required, the safety circuit 66 is neutralized and the welding torch is quickly brought into the working position. The flame then heats the parts to be welded and is then retracted. The extremity of the wire 24 is then brought into contact with the parts to be welded, the temperature of which causes the wire to melt, thereby assembling the parts. As soon as the safety circuit is reactive, the flame is brought back into the rest position. The robot is then moved to a new working position without any risk of damaging one of other component placed on the support thereof.

It is understood that the program controlling the robot gives the instructions for displacing the head and neutralizing-activation of the safety circuit, making it possible to detect the presence of a flame.

If the flame should be extinguished for any reason, the probe 64 would no longer be heated when the welding torch is in the rest position. The gas supply would then be interrupted and the machine stopped. This makes it possible to intervene immediately and to remove the badly welded part. The fact that the supply is not immediately interrupted when the flame is blown out does not constitute an explosion risk since the volume of gas emitted is very low, typically between 100 and 500 liters of gas per hour at ordinary pressure. This explains why it is enough to monitor the presence of the flame in the rest position only.

By means of the above design it is possible to produce a robot having a flame gas heating head in which the flame can remain at the same intensity without the risk of damage to the parts located in the vicinity thereof. The flame remains completely stable; the quality of the weld is assured and, moreover, no time is lost.

The welding head as described hereinabove is of course capable of numerous modifications. It is thus possible to replace the pneumatic motor by a digital electric motor that makes it possible to point the welding torch in any direction. It would also be feasible to control movement of the part 57 electrically, synchronously with the working position programmed for the welding torch 6.

In addition to welding operations, a head of this kind makes it possible for example to strip the wires just before they are put into position as well as to carry out numerous other operations for which high temperatures are needed.

The welding torch can be mounted on a head in conjunction with other tools, for example a welding iron bit. In this case the essential function of the welding torch is to strip the wires when the bit is used for welding operations.

What is claimed is:

1. A flame gas heating device for use with a robot comprising a body adapted to be fixed to the robot, a support mounted on the body, a welding torch integral with the support, connecting means to ensure the mobility of the support on said body, and a confinement enclosure, said support and said welding torch being able to occupy a first position in which the flame associated with the welding torch is capable of carrying out a heating operation, and a second rest position in which said flame is confined within said enclosure.

2. A heating device according to claim 1, wherein said enclosure is integral with a heat probe controlling a shut-off circuit for the gas supply to the welding torch.

3. A heating device according to claim 1, wherein the connecting means is adapted to enable the welding torch to rotate about a horizontal axis perpendicular to the axis of the welding torch.

4. A heating device according to claim 1, which also comprises a screen masking the flame during passage from the first to the second position.

* * * * *